United States Patent
Farnham

[15] 3,640,686
[45] Feb. 8, 1972

[54] WASTE WATER PURIFICATION
[72] Inventor: Robert A. Farnham, 21 Valleystone Drive, San Rafael, Calif. 94903
[22] Filed: Nov. 2, 1970
[21] Appl. No.: 86,163

[52] U.S. Cl...............................23/181, 208/216, 208/274, 210/21, 210/59
[51] Int. Cl....................................C01b 17/16, C01g 23/02
[58] Field of Search...............23/181; 208/216, 274; 210/21, 210/59

[56] References Cited

UNITED STATES PATENTS

| | | | |
|---|---|---|---|
| 3,451,923 | 6/1969 | Welty | 208/211 |
| 2,918,427 | 12/1959 | Adams et al. | 208/217 |
| 3,108,062 | 10/1963 | Davis | 208/274 |

*Primary Examiner*—Oscar R. Vertiz
*Assistant Examiner*—Charles B. Rodman
*Attorney*—A. L. Snow, F. E. Johnson, G. F. Magdeburger, C. J. Tonkin and T. G. DeJonghe

[57] ABSTRACT

A process for purifying an aqueous stream contaminated with organic sulfonate salts having a carbon number of at least four and for producing purified oil and $H_2S$ which process comprises contacting the aqueous stream with an acid to convert the organic sulfonate salt to an organic sulfonic acid, extracting the organic sulfonic acid from the aqueous stream by contacting the aqueous stream with a $C_6+$ hydrocarbon to obtain a contaminated $C_6+$ hydrocarbon stream containing the organic sulfonic acid, and hydrofining the contaminated $C_6+$ stream by contacting the stream, at a temperature between 450° and 900° F. and in the presence of added hydrogen gas, with a hydrofining catalyst. The process can also be applied to aqueous streams containing naphthenate salts.

3 Claims, 1 Drawing Figure

PATENTED FEB 8 1972
3,640,686
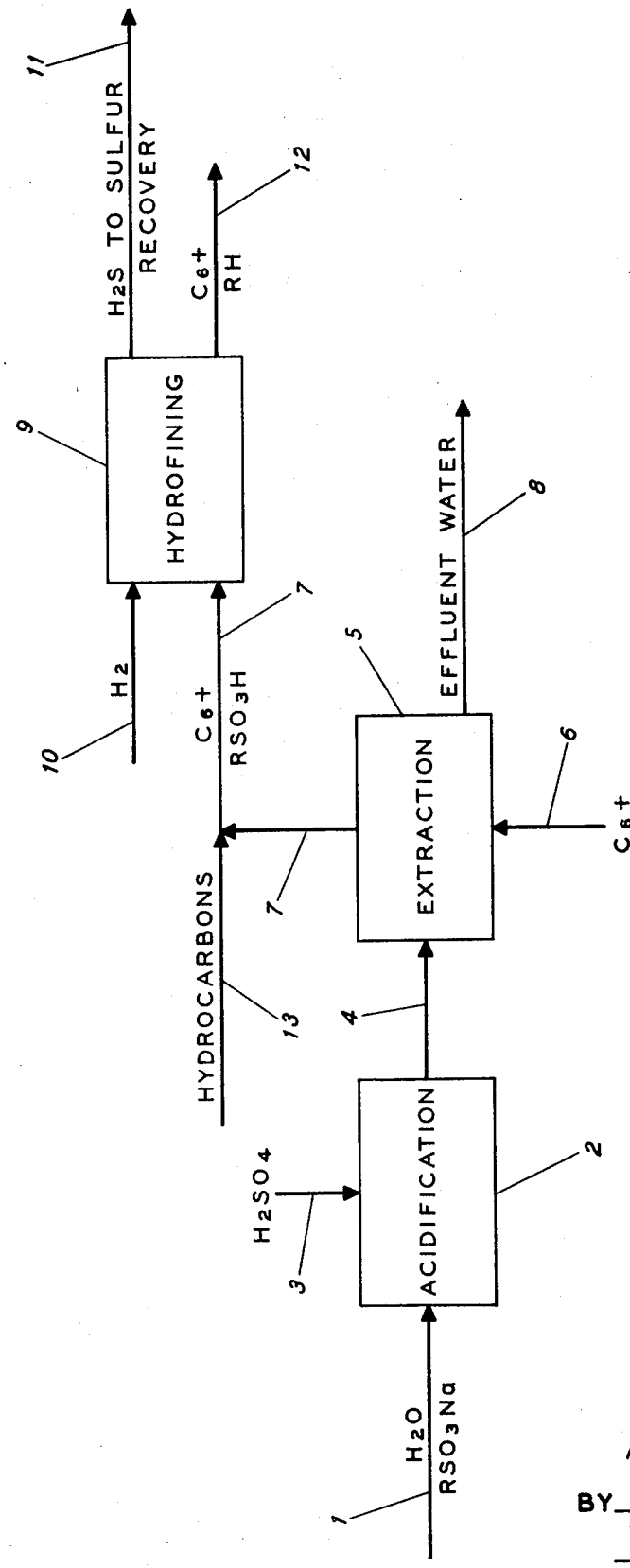
INVENTOR
ROBERT A. FARNHAM
BY J.G. De Jonghe
C.J. Tonkin
ATTORNEYS

WASTE WATER PURIFICATION

BACKGROUND OF THE INVENTION

The present invention relates to the purification of contaminated water. More particularly, the present invention relates to the purification of water streams contaminated with sulfonate compounds.

Hydrocarbon oils, such as for example those obtained by the fractional distillation of petroleum, often are contaminated with impurities which are susceptible of removal of sulfuric acid. Such impurities include sulfur bodies, nitrogenous bodies, unsaturated compounds, etc. These impurities are readily removed or reduced by treatment with sulfuric acid. When the sulfuric acid treatment is completed and the sulfuric acid is separated from the treated oil by any suitable means (such as by gravity, centrifugation, electrostatic treatment, etc.), the sulfuric acid treated hydrocarbon is then treated with caustic to remove sulfuric acid and other residual acid bodies remaining in the hydrocarbon. After the caustic phase is separated from the hydrocarbon by any suitable means (gravity, centrifugation, electrostatics, etc.) the hydrocarbon is water washed to remove caustic and other residual water soluble impurities present in the oil. The water obtained upon separating the oil and the water is contaminated with organic sulfonate salts which may be represented as $RSO_3Na$. The R group of the organic sulfonate salt can be any of a wide range of hydrocarbonaceous compounds including naphthenes, alkyl groups and aromatic groups.

One of the objectives of the process of the present invention is to remove organic sulfonate salts from the water in order to obtain more pure less toxic water or water which may more readily be made suitable for disposal into bays, streams or rivers. The process of the present invention is particularly advantageously applied to the removal of sulfonates from water, such as waste water used for washing lube oil, because the sulfonates generally have a high toxicity, even in small amounts, to marine life such as fish. Lube oil sulfonates often are toxic to fish as a concentration as low as one part per million.

Various processes have been proposed for treating contaminated water streams. For example, U.S. Pat. No. 2,773,003 titled "Waste Water Treatment," discloses a process for treating contaminated water from various refinery sources. The contaminated refinery water is passed into a zone wherein it is countercurrently contacted with a stripping gas which removes volatile contaminates from the water and thereby produces a contaminant-containing gas stream and a substantially volatile contaminant-free water stream. It is contemplated that the stripping gas stream will comprise sweet fuel gas, sweet natural gas, flue gas, etc., or any combinations thereof, available at a refinery at sufficient pressure to be used in an atmospheric stripping operation. U.S. Pat. No. 2,899,385, titled "Process for the Treatment of Contaminated Waste Waters," also discloses a process for purifying contaminated water streams such as those obtained in petroleum refining. U.S. Pat. No. 2,899,385, is directed to reducing the chemical oxygen demand and biological oxygen demand of refinery effluent waters by a process wherein substantially all the high-oxygen demand contaminants are removed in cooling towers by biochemical means. U.S. Pat. No. 3,335,071, is directed to the separation of $NH_3$ and $H_2S$ from refinery foul water. The $NH_3$ and $H_2S$ are recovered separately by stripping distillation carried out at superatmospheric pressures in interconnected distillation columns. Thus, the process of U.S. Pat. No. 3,335,071, is directed to the relatively volatile compounds $H_2S$ and $NH_3$.

The process of the present invention is directed to the removal of relatively nonvolatile contaminants in a particularly advantageous overall process wherein the contaminant is converted at least in part to valuable byproducts, particularly hydrogen sulfide and purified oil.

SUMMARY OF THE INVENTION

According to the present invention, a process is provided for purifying an aqueous stream contaminated with an organic sulfonate salt having a carbon number of at least four and producing purified oil and $H_2S$. The process comprises contacting the aqueous stream with an acid to convert the organic sulfonate salt to an organic sulfonic acid, extracting the organic sulfonic acid from the aqueous stream by contacting the aqueous stream with a $C_6+$ hydrocarbon to obtain a contaminated $C_6+$ hydrocarbon stream containing the organic sulfonic acid, and hydrofining the contaminated $C_6+$ stream by contacting the stream, at a temperature between 450° and 900° F. and in the presence of added hydrogen gas, with a hydrofining catalyst.

One of the particular advantages of the process of the present invention is the relative ease with which it may be incorporated into an existing refinery operation. The organic sulfur compound salt can be present in the contaminated water feedstream to the process of the present invention together with other water soluble salts and these salts can be acidified in a common acid contacting or mixing zone using an acid such as sulfuric acid which is readily available in the refinery. The acidification step converts the organic sulfonate salt to an organic acid which can be extracted with a hydrocarbon stream such as a gasoline, kerosene or gas oil stream readily available in a refinery. The hydrocarbon stream with the extracted organic sulfonic acid is then hydrofined to convert the organic sulfonic acid to $H_2S$ and sulfur-free hydrocarbon product. The final hydrofining or hydrodesulfurization step of the process of the present invention is readily carried out using hydrofining facilities which are typically present in most oil refineries for use in processes to produce gasoline, jet fuel and other valuable hydrocarbons.

In accordance with a preferred embodiment of the process of the present invention, the hydrocarbon which is used to extract the organic sulfonic acid from the acidified water is a hydrocarbon contaminated with minor amounts of organic sulfur compounds such as mercaptans so that the subsequent hydrofining step will serve the dual purpose of converting both the mercaptan-sulfur compounds and the extracted organic sulfonic acid compounds to $H_2S$ and sulfur-free hydrocarbons during the hydrofining portion of the process of the present invention. Also, low-toxicity hydrocarbons (i.e., hydrocarbons which are relatively harmless to fish compared to equal amounts of sulfonates such as benzene sulfonate or naphthenic sulfonates) are preferred for use as sulfonic acid extractants and to this extent, mercaptan containing hydrocarbon extractants are less preferred. $C_6+$ hydrocarbon fractions are preferred as extractants, and particularly $C_8+$ fractions are preferred because of the relatively high molecular weight and consequent low water solubility of the heavier hydrocarbon fractions as opposed to butanes or pentanes.

BRIEF DESCRIPTION OF THE DRAWING

The drawing is a process flow diagram schematically illustrating the process of the present invention.

DETAILED DESCRIPTION

Referring now more particularly to the drawing, a feed-contaminated water stream is introduced via line 1 to acidification zone 2. As indicated previously, the water feedstream can be separated water remaining from the washing of acid treated oils. The contaminated water streams introduced to the process via line 1 may also be water from naphthenate removal from gas oils or aqueous caustic streams separated, for example, from oil acid treating processes which are followed by a caustic wash step.

In acidification zone 2, the water contaminated with the organic sulfonate salt is contacted with an acid, preferably sulfuric acid, introduced to zone 2 via line 3. The contacting may be carried out by passage through a mixing valve or by mixing in a tank or other vessel. The main reaction occurring during the acidification can be represented as follows:

$$RSO_3Na + H_2SO_4 \rightleftarrows RSO_3H + NaHSO_4$$

The acidified aqueous stream is removed from zone 2 via line 4 and passed to extraction zone 5. In extraction zone 5, organic sulfonic acids are removed from the aqueous stream by contacting the aqueous stream with a hydrocarbon stream introduced via line 6 to zone 5. The process of the present invention is preferably applied to the removal of organic sulfonate salts wherein the R group contains at least four carbon atoms as the resulting organic sulfonic acid is considerably more soluble in the hydrocarbon in the case of higher carbon number organic groups than in the case of relatively low carbon number organic groups such as methyl or ethyl groups. It is also preferred to use as the hydrocarbon extractant a hydrocarbon having a carbon number of at least six, and thus the hydrocarbon extractant is referred to as a $C_6+$ stream. The $C_6+$ hydrocarbon extractant can be a gasoline fraction or a kerosene or gas oil fraction readily available in a petroleum refinery.

The extraction zone can be comprised of a mixing vessel or a countercurrent extraction column filled with contact surfaces such as Raschig rings or Berl saddles to increase the contacting efficiency. The $C_6+$ hydrocarbon extractant is preferably passed countercurrent to the water containing the organic sulfonic acid stream introduced via line 4, so that a hydrocarbon phase containing extracted organic sulfonic acid is withdrawn via line 7 from zone 5 and water freed of the organic sulfonic acid is withdrawn via line 8.

The water withdrawn via line 8 can be passed to an oxidation pond to oxidize, for example, sodium hydrosulfate to sodium sulfate before final disposal of the water.

The $C_6+$ hydrocarbon containing the organic sulfonic acid is passed via line 7 to hydrofining zone 9, wherein the hydrocarbon stream is contacted at elevated temperature and pressure and in the presence of hydrogen introduced via line 10 with hydrofining catalyst to produce an $H_2S$ byproduct which is withdrawn via line 11 and a purified hydrocarbon stream which is withdrawn via line 12. A portion or all of the hydrocarbon stream withdrawn via line 12 can be recycled to extraction zone 5 for reuse in extraction of organic sulfonic acid from water.

Preferred operating conditions for the hydrofining or hydrodesulfurization carried out in zone 9 include a hydrogen feed rate between about 500 and 10,000 SCF per barrel of hydrocarbon feed, a temperature between about 450° and 900° F. and more preferably, between 550° and 800° F., a hydrogen partial pressure between about 500 and 5,000 p.s.i.g., and a catalyst consisting of Group VI and/or Group VIII metallic hydrogenation components together with an inorganic refractory support material such as alumina or silica-alumina. Suitable reaction conditions for hydrodesulfurization or hydrofining in zone 9 including suitable catalyst compositions are disclosed in U.S. Pat. No. 3,425,934. Particularly suitable catalysts for use in zone 9 include cobalt molybdate catalyst, such as disclosed for example in U.S. Pat. No. 2,830,960.

The hydrofining zone 9 includes $H_2S$ separation facilities. Particularly preferred means for separating $H_2S$ from the hydrofining process are the interconnected aqueous distillation methods as disclosed in U.S. Pat. No. 3,335,071. The $H_2S$ can also be separated from recycle hydrogen gas used with the hydrofining zone as disclosed, for example, in U.S. Pat. Nos. 2,916,444 and 2,918,427.

In addition to the $C_6+$ hydrocarbon stream which is used in extraction zone 5, one or more additional hydrocarbon streams can be introduced to hydrofining zone 9 via lines 13 and 7 to hydrodesulfurize or hydrodenitrify the hydrocarbon streams simultaneously with the conversion of the extracted organic sulfonic acid to $H_2S$ and sulfur-free hydrocarbon.

Although the process of the present invention has been primarily described as applied to sulfonates, one of the advantages of the process is its applicability to simultaneous removal of naphthenate impurities from water. As applied to naphthenate salts, the reaction in the acidification step can be characterized as follows:

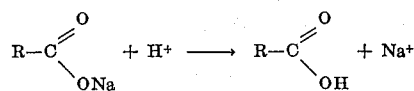

The reaction in the hydrogenation or hydrofining step can be characterized as follows:

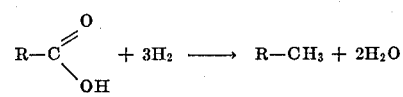

Thus, the process of the present invention can be applied to streams containing both naphthenate salts and sulfonate salts, or aqueous streams containing only one of the salts.

Although various embodiments of the invention has been described, it is to be understood that they are meant to be illustrative only and not limiting. Certain features may be changed without departing from the spirit or scope of the present invention. It is apparent that the present invention has broad application to the removal of organic sulfonate compounds from water by acidification followed by hydrocarbon extraction and hydrofining. Accordingly, the invention is not to be construed as limited to the specific embodiments or examples discussed but only as defined in the appended claims or substantial equivalents of the claims.

I claim:

1. A process for purifying an aqueous stream contaminated with an organic sulfonic salt having a carbon number of at least four and for producing purified oil and $H_2S$ which process comprises contacting the aqueous stream with an acid to convert the organic sulfonate salt to an organic sulfonic acid, extracting the organic sulfonic acid from the aqueous stream by contacting the aqueous stream with a $C_6+$ hydrocarbon to obtain a contaminated $C_6+$ hydrocarbon stream containing the organic sulfonic acid, and hydrofining the contaminated $C_6+$ stream by contacting the stream, at a temperature between 450° and 900° F. and in the presence of added hydrogen gas, with a hydrofining catalyst to produce $H_2S$ and a purified hydrocarbon, and separating said $H_2S$.

2. A process in accordance with claim 1 wherein the acid is sulfuric acid.

3. A process for purifying an aqueous stream contaminated with a naphthenate salt having a carbon number of at least four and producing purified oil and $H_2O$ which process comprises contacting the aqueous stream with an acid to convert the naphthenate salt to a naphthenic acid, extracting the naphthenic acid from the aqueous stream by contacting the aqueous stream with a $C_6+$ hydrocarbon to obtain a contaminated $C_6+$ hydrocarbon stream containing the naphthenic acid, and hydrofining the contaminated $C_6+$ stream by contacting the stream, at a temperature between 450° and 900° F. and in the presence of added hydrogen gas, with a hydrofining catalyst to produce $H_2S$ and a purified hydrocarbon, and separating said $H_2S$.

* * * * *